United States Patent

Dirtoft

[11] Patent Number: 5,100,088
[45] Date of Patent: Mar. 31, 1992

[54] FIXTURE FOR SUPPORTING OBJECTS SO THAT THE OBJECTS WILL BE ABSOLUTELY FIRM

[76] Inventor: Ingegerd Dirtoft, Eriksbergsgatan 38, S-114 30 Stockholm, Sweden

[21] Appl. No.: 585,071
[22] PCT Filed: Apr. 25, 1989
[86] PCT No.: PCT/SE89/00229
  § 371 Date: Oct. 17, 1990
  § 102(e) Date: Oct. 17, 1990
[87] PCT Pub. No.: WO89/11117
  PCT Pub. Date: Nov. 16, 1989

[30] Foreign Application Priority Data

May 2, 1988 [SE] Sweden ............ 8801651

[51] Int. Cl.$^5$ ............................................. F16M 11/00
[52] U.S. Cl. ................................... 248/176; 248/346; 269/309
[58] Field of Search ............ 248/346, 176, 650, 177, 248/187; 269/309

[56] References Cited

U.S. PATENT DOCUMENTS

| | | | |
|---|---|---|---|
| 1,994,601 | 3/1935 | Wellman et al. ............ | 248/650 |
| 2,624,107 | 1/1953 | Carpenter ............ | 269/309 X |
| 2,771,821 | 11/1956 | Beusch ............ | 269/309 X |
| 2,816,489 | 12/1957 | Robbins et al. ............ | 269/309 |
| 2,861,485 | 11/1958 | Padavano ............ | 269/309 |
| 2,887,017 | 5/1959 | Lassy ............ | 269/309 |
| 4,184,669 | 1/1980 | Bald ............ | 269/309 |
| 4,522,330 | 6/1985 | Kerrey et al. ............ | 269/309 X |
| 4,880,220 | 11/1989 | Buchler ............ | 269/309 X |

FOREIGN PATENT DOCUMENTS 1563858  4/1980  United Kingdom ............ 248/650

*Primary Examiner*—David L. Talbott
*Attorney, Agent, or Firm*—Sughrue, Mion, Zinn, Macpeak and Seas

[57] ABSTRACT

A fixture for supporting objects for holographic testing comprises by two plates (11,12) which are attached rigidly and permanently to one another and of which, when the fixture is placed on a horizontal support surface, a first plate (11) will form a relatively small angle with a vertical plane, which angle will be substantially different from 0°, whereas the second plate (12) will form a relatively large angle ($\beta$) with a vertical plane, which angle will be substantially different from 90°. The plates are provided with holes (121,122) for receiving pegs for supporting abutment with an object.

6 Claims, 2 Drawing Sheets

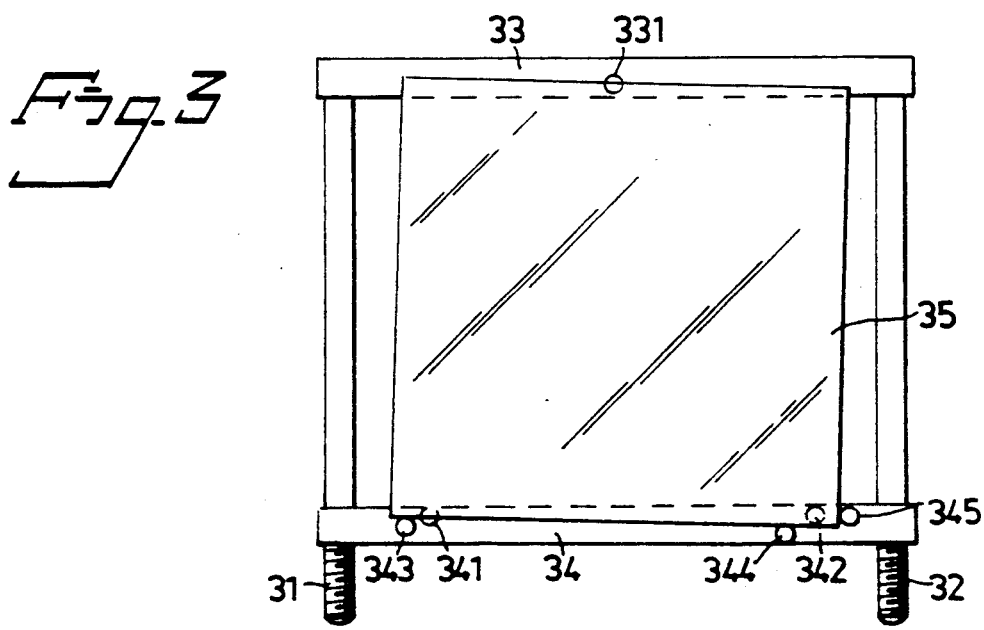
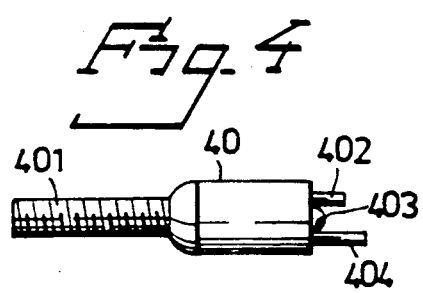
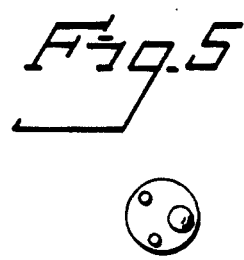
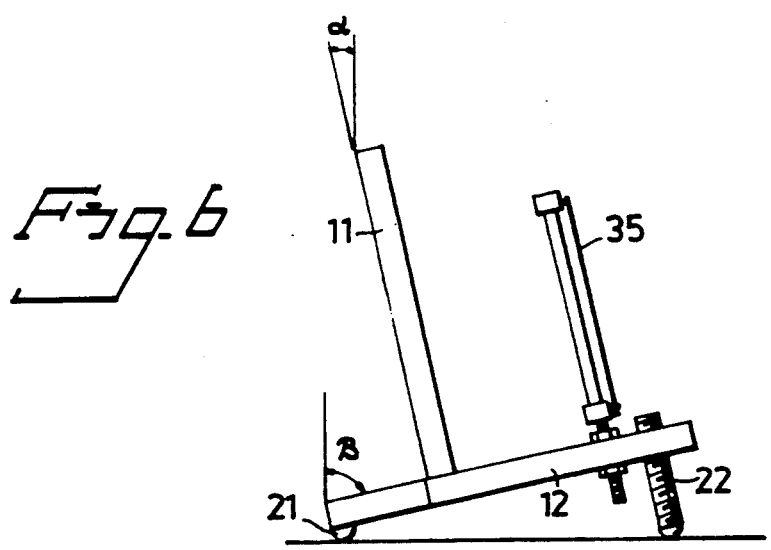

5,100,088

FIXTURE FOR SUPPORTING OBJECTS SO THAT THE OBJECTS WILL BE ABSOLUTELY FIRM

TECHNICAL FIELD

The present invention relates to a fixture for supporting objects so that the objects will be absolutely firm, i.e. will not shake or tremble, e.g. for supporting objects and hologram plates in the practice of holography.

BACKGROUND PRIOR ART

It is known to examine and measure the extent of the deformation of an object with the aid of holography. Double exposure of hologram plates enables changes in shape to be made visible on a hologram, in the form of images having a larger or smaller number of stripes in different configurations. This enables extremely small changes in shape, e.g. deformations as small as 0.3 micron, to be measured, which is highly significant when monitoring the quality of or load testing mechanical constructions. In view of the very small dimensions concerned in this regard, it is important that shaking between objects being examined and hologram plates used to take the two exposures be prevented to the maximum extent possible. Previously, certain difficulties have been experienced in fulfilling these conditions without the use of excessively complicated and expensive arrangements.

An object of the present invention is to provide means which will enable two objects, e.g. industrial products and hologram plates, to be mounted in a manner which will substantially prevent shaking from occurring and which will enable the same relative positions between the objects to be re-established subsequent to having moved one of said objects.

SUMMARY OF THE INVENTION

A fixture constructed in accordance with the invention includes two permanently and stably attached plates, each of which is provided with a plurality of holes for the attachment of support pegs of particular configuration. These pegs are intended for supporting objects. The one plate forms a relatively small angle with a vertical plane. It is mainly this plate that will support an object to be examined, e.g. an industrial object. The other plate forms a relatively large angle with a vertical plane. It is this plate which will support a second object, e.g. a hologram plate and optionally also the industrial object, depending upon the shape and dimensions thereof. The particular construction of the fixture ensures that the objects achieve positive and reproduceable abutment under the influence of gravity.

BRIEF DESCRIPTION OF THE DRAWINGS

The invention will now be described in more detail with reference to the accompanying schematic drawings, where

FIG. 3 illustrates a holder for hologram plates with plates inserted;

FIG. 4 shows a support peg from one side;

FIG. 5 is a straight-on front view of the support peg shown in FIG. 4; and

FIG. 6 is a side view of an inventive fixture with inserted plate holders in greatly reduced scale.

DESCRIPTION OF A PREFERRED EMBODIMENT

Figure 1:
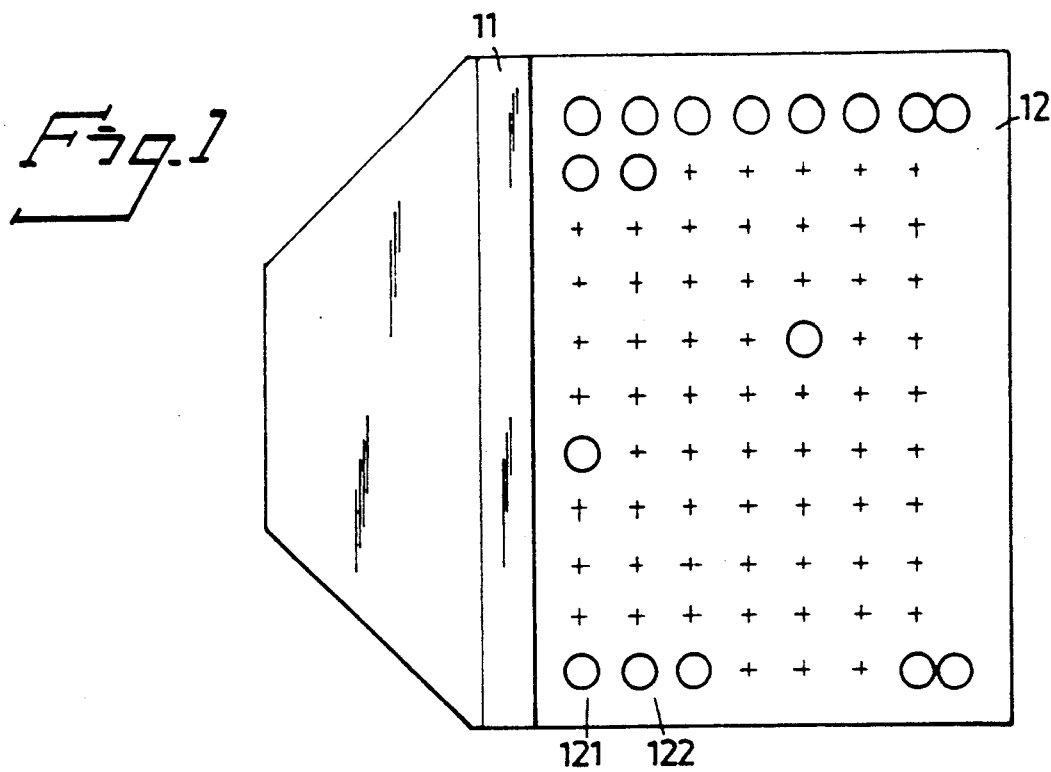
FIG. 1 illustrates from above a fixture constructed in accordance with the invention.

The fixture illustrated in FIG. 1 includes two plates 11 and 12 which are fastened stably and permanently one to the other. The plate 12 has formed therein a plurality of holes, of which two are referenced 121, 122, which are intended for the attachment of screw-threaded support pegs and a holographic plate holder.

Figure 2:
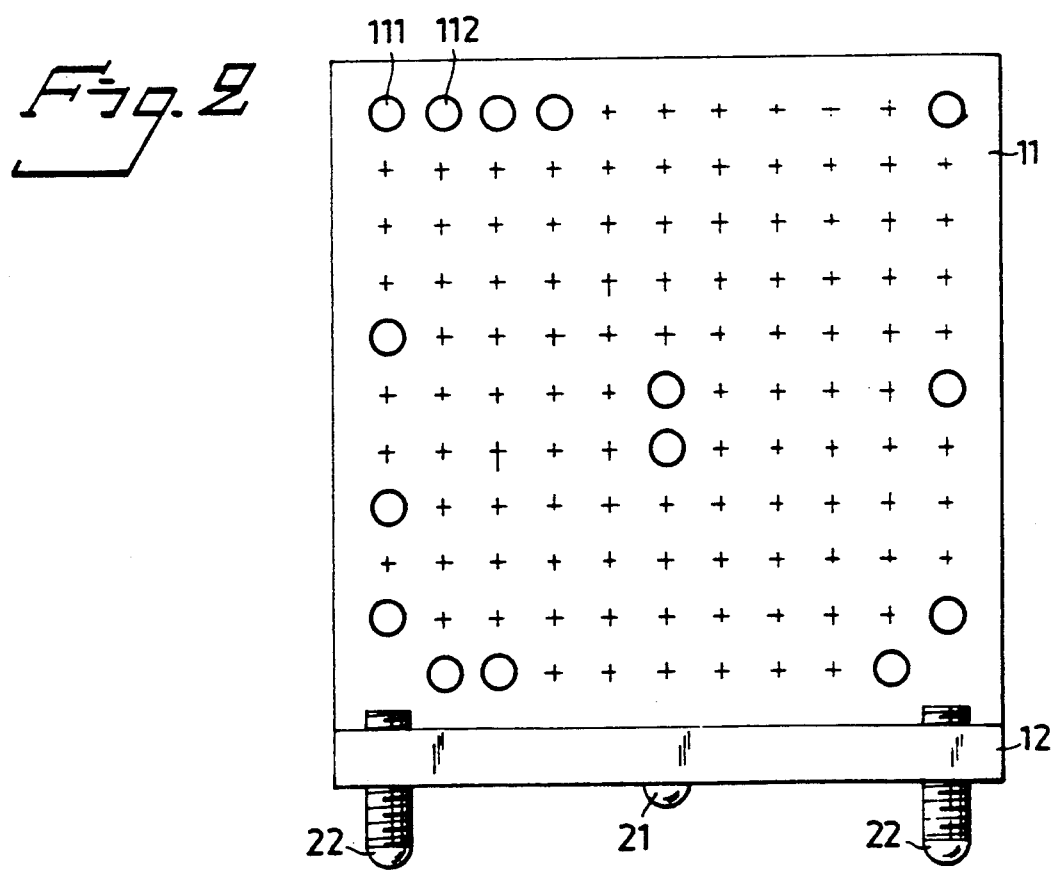
FIG. 2 is a straight-on front view of the fixture illustrated in FIG. 1.

As will be seen from FIG. 2, the plate 11 is also provided with a plurality of holes, of which two are referenced 111, 112, which are intended for the attachment of screw-threaded support pegs. In the FIG. 2 illustration the plate 12 has three support points, namely a hemispherical projection 21 located symmetrically on the inner end of the plate, close to its attachment with the plate 11, and two symmetrically located legs 22 which can be displaced in holes in said plate. The two holes mentioned above are outwardly conical, so as to conform to the conical abutment surfaces of support pegs intended for screwing into the plates.

When the fixture 11-12 is placed on a flat, horizontal support surface, the plate 11 will form a relatively small angle $\alpha$ with a vertical plane, which angle, however, is substantially different to zero, whereas the other plate 12 will form a relatively large angle $\beta$ with a vertical plane, which angle, however, is substantially different from 90°. The angle $\alpha$ will preferably lie in the range 6°-16° and will suitably be 11°. The angle $\beta$ will preferably lie in the range 74°-84°, and will suitably be 79°.

The holder illustrated in FIG. 3 comprises a framework of two vertical posts 31, 32, the lower ends of which are screw threaded, and two horizontal struts 33, 34. The lower ends of the posts are intended to be received in corresponding holes in the plate 12, the location of the holes being chosen with respect to the shape and dimensions of the object to be anchored to the plate 11. Located on the strut 33 is a hemispherical projection 331, whereas the strut 34 has located thereon two hemisperical projections 341, 342 and three support pegs 343, 344 and 345. As shown, the support pegs 343, 344 and 345 are intended for supporting abutment with the edge surfaces of a holographic plate 35, with the surface of the plate bearing against the projections 331, 341, 342.

FIG. 4 illustrates a support peg 40 which has a conical abutment surface and a screw-threaded part 401 for insertion into a hole in the plate 11, said peg being secured in the hole with the aid of two nuts. The screw-threaded part 401 of certain pegs is considerably shorter than the screw-threaded part of other pegs, these pegs of shorter screw thread being intended to be conical abutment surfaces of the peg and the plate. Located on one end of the peg is a short pin 402, a longer pin 404, and a hemispherical projection 403. The relative positions of these elements will be apparent from FIG. 5.

FIG. 6 shows the fixture from one side thereof, with the fixture resting on a horizontal support surface. FIG. 6 also shows the angles $\alpha$ and $\beta$ formed by respective plates 11 and 12 with a vertical plane.

The holder of FIG. 3 can be displaced vertically and is fixed or locked in selected positions, with the aid of lock nuts fitted to the screw threaded posts 31, 32.

I claim:

1. A fixture for supporting test objects and hologram plates when practicing holography, said fixture comprising: two plates (11, 12) attached rigidly and permanently one to the other and of which, when the fixture is placed on a horizontal support surface, a first one of said plates (11) forms a relatively small angle (α), substantially different from 0°, with a vertical plane, and a second one of said plates (12) forms a relatively large angel (β), substantially different from 90°, with a vertical plane, wherein each of said two plates is provided with a plurality of spaced holes (111, 112 . . . 121, 122 . . . ) for individually and selectively receiving pegs (40) for supporting abutment with a test object to be supported, and a plurality of support pegs inserted into said holes in accordance with the shape and dimensions of a test object such that the object achieves positive abutment with the support pegs under the influence of gravity, to attendantly enable an initial position of the object to be accurately reestablished subsequent to the movement thereof.

2. A fixture according to claim 1, wherein said second plate has support points for supporting said plate on a horizontal surface, said support points comprising a hemispherical projection (21) located symmetrically on an inner end of the plate close to an attachment thereof to the first plate, and two symmetrically positioned legs (22) inserted into holes in an end of the plate distal from said inner end thereof.

3. A fixture according to claim 1 or 2, wherein the plurality of holes in the plates are outwardly conical; and wherein each of the support pegs has a corresponding conical abutment surface and a screw-threaded end for the attachment of the peg to a plate.

4. A fixture according to claim 1 or 2, wherein the angle (α) between the first plate (11) and vertical plane lines in a range of 6°-16°; and the angle (β) between the second plate (12) and a vertical plane lies in a range of 74°-84°.

5. A fixture according to claim 4, wherein the angle (α) is about 11°, and the angle (β) is about 79°.

6. A fixture according to claim 4, further comprising a frame for supporting a holographic plate (35), said frame being mounted to the second plate and upstanding therefrom at a selected position spaced from the first plate, and said frame being substantially parallel to the first plate.

* * * * *